July 4, 1967   C. KOCH   3,329,337
EVALUATION DEVICE FOR AN EXPOSURE METER
Filed Dec. 22, 1965

INVENTOR.
Carl Koch
BY
Watson, Cole, Grindle & Watson
Attys.

United States Patent Office 3,329,337
Patented July 4, 1967

3,329,337
EVALUATION DEVICE FOR AN
EXPOSURE METER
Carl Koch, Vodersteig 2, Schaffhausen, Switzerland
Filed Dec. 22, 1965, Ser. No. 515,635
Claims priority, application Switzerland, Oct. 22, 1965,
14,782/65
4 Claims. (Cl. 235—64.7)

This invention relates to a light or exposure meter for photographic purposes with several scales running parallel one to another and arranged one above another and partly in different planes. Light meters of this type are known in varied designs. An object of this invention consists in a practical construction and arrangement of the device having the scales, where at least one of the scales is exchanged easily so that one can better take into account photographic materials used or special techniques for illumination or for measuring the brightness of the objects to be photographed.

The light meter according to this invention excels essentially by the fact that at least one of the scales has been arranged on a constructional element, such as for example, a rotating disc or slide, consisting of transparent material, said constructional element being mounted movably and removably and covering the remaining scales completely but leaving them at least partially visible.

In the case of a preferred design, the transparent constructional element is a dial with a peripheral collar protruding in back, which surrounds on the outside, the circular disc shaped carriers of all the scales. At the same time, the dial can be mounted rotatably and removably on a centrally located axis stub, whereby the dial and the axis stub will advantageously be assembled and developed in the manner of a spring equipped pressure button.

There can be two or more of these transparent dials, which carry differently divided scales and which can be placed according to one's choice. However, instead of that or additionally, it is also possible to arrange the exchangeable scale on a scale bearer attached detachably and exchangeably on the backside of the transparent dial. Of the various scales one can be for example, as usual, a purely geometric progressive scale of the times of exposure, while another one is a differently divided time scale for immediate consideration of the reciprocity low failure. As is well known, the reciprocity low failure consists in that in the case of exposure times of longer than about $\frac{1}{25}$ second, the otherwise proportional connection between exposure time and lens diaphragm aperture is lost and an increasingly longer exposure time will be needed, depending in each case on the photographic material, in order to obtain a faultless exposure.

Further objects of the invention will be apparent from the following description when considered in connection with the accompanying drawing in which.

Figure 5:
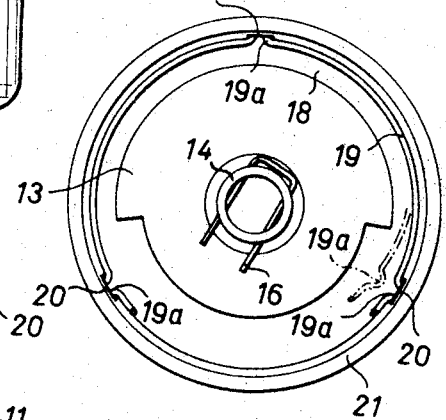
FIG. 5 is a bottom plan view of the constructional element developed as a dial.
Figure 4:
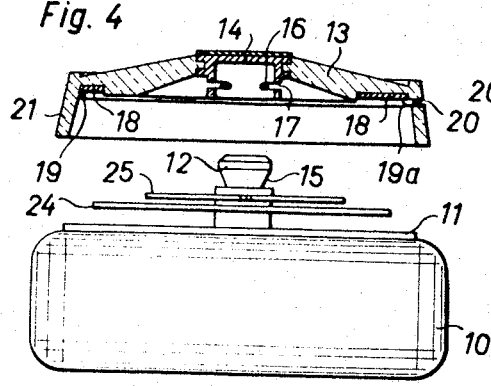
FIG. 4 is a cross section of the meter with the dial lifted off and showing a part in side elevation.

On the top side of a light or exposure meter housing 10, a circular plate 11 is secured which bears a central axis stub 12, as shown in FIG. 4. On the axis stub 12, a dial 13 has been rotatably mounted consisting of a transparent material, such as for example, acrylic glass. In the middle part of the dial 13, a metallic casing 14 is embedded therein, which fits over the axis stub 12. In order to make possible an easy removal of the dial 13, the upper end of the axis stub 12 and the casing 14 have been formed and adapted to one another in the manner of an elastic pressure button or snap fastener. For this purpose the axis stub 12 has a peripheral groove 15 in which two legs of a stirrup-shaped wire spring 16 can lock, said wire spring being projected through lateral slots 17 of a casing 14, as can be seen from FIGS. 4 and 5.

On the backside of the transparent dial 13, a scale bearer 18 shaped like a circular disc has been arranged and is held fast with the aid of an expanding spring ring 19. In the case of the example shown, this latter has three lobes 19a, FIG. 5, formed by bending out notches which, under the influence of the elasticity of the ring, engage in slot-shaped recesses 20, which are located within a peripheral collar 21 and projecting backwards, of the dial 13. The scale bearer 18 if desired can be taken out and exchanged. The front side of the scale bearer 18, which is visible through the dial 13, has an exposure time scale 22 and a light value scale 23, FIG. 1.

A scale disc 24 has been mounted rotatably on the axis stub 12, a smaller disc 25 being attached non-rotatably over the other disc. The disc 25 has a pointer 26 which is assigned and cooperates to the light value scale 23. Furthermore, the disc 25 has been provided with two windows 27 and 28 through each of which a scale for different sensitivities of photographic materials is visible. The last mentioned scales are arranged on the rotatable disc 24, which carries beside that a scale 29 with diaphragm aperture values, the latter scale being opposite to the exposure time scale 22.

Figure 1:
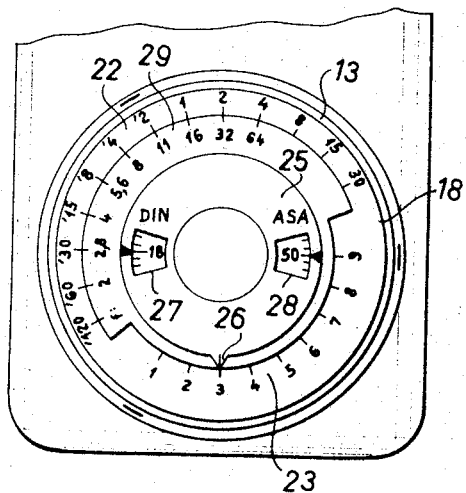
FIGURE 1 is a plan view of a part of a light meter according to the invention.

When the dial 13 is placed on the axis stub 12, all the above mentioned scales are covered by the dial and are at least partially visible therethrough, as FIG. 1 clearly illustrates. By means of the dial 13 and its peripheral collar 21, the scale disc 24 cannot carry out an unwanted operation, so that the sensitivity adjusted in the two windows 27 and 28 cannot be changed unintentionally.

For setting the exposure meter described to a certain sensitivity of the photographic material to be used, first of all the dial is lifted axially from the axis stub 12, which can be accomplished easily by overcoming the effect of the spring 16. Then the disc 24 is turned in such a manner that the desired sensitivity rate will appear in window 27 or 28. Finally, the dial 13 is again placed onto the axis stub 12. When using the exposure meter, the brightness of the object that is to be photographed will be measured with the help of a photoelectric instrument, not shown. The light value found in this manner will be set by turning of the dial 13 on the scale 23, opposite to the pointer 26. Then, one can read in the customary manner from scales 22 and 29, the values to be used for the photographic pictures concerning exposure time and diaphragm aperture, respectively.

In the case of the structure shown in FIG. 1, the exposure time scale 22 has been graduated, as usual, strictly geometrically, so that the product of surface of diaphragm opening and exposure time, obtained by multiplication, will be constant. As a consequence of the so-called reciprocity low failure, one will however obtain in this process faulty results, whenever the exposure time is more than about $\frac{1}{25}$ second. To compensate for the reciprocity low failure, one will then need correspondingly prolonged exposure times or enlarged diaphragm aperture. The necessary corrections differ for different photographic materials and they can be found in tables or straight-line charts, which however is awkward and time consuming.

Figure 2:
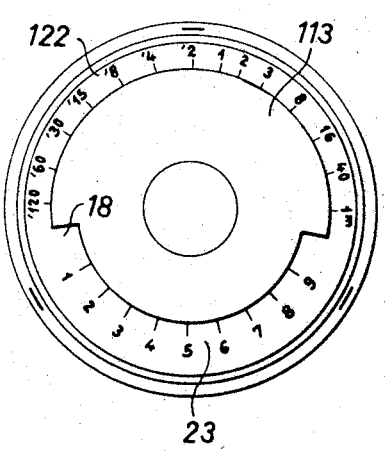
FIG. 2 is a plan view showing a dial construction, which can be exchanged for a corresponding part of the light meter according to FIG. 1.
Figure 3:
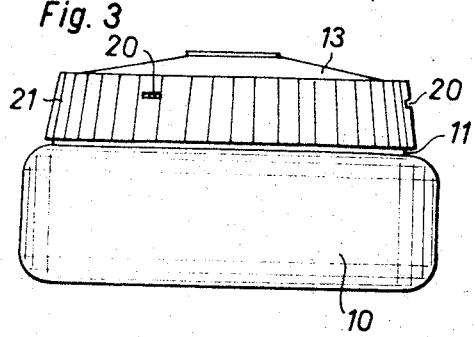
FIG. 3 is a side elevation of the light meter according to FIG. 1.

In order to avoid these difficulties and in a further development of the exposure meter according to this invention and as described so far, a second dial 113 will be available, FIG. 2, which dial is developed exactly the same as dial 13 and which can be placed according to one's choice in its place on the axis stub 12. The second dial 113 has on the scale bearer 18 a differently graduated and/or differently numbered exposure time scale 122, which takes into direct consideration the reciprocity low failure for a frequently used material. The light value scale 23, which is also on the bearer 18, agrees completely with the scale of the dial 13.

If using other photographic materials, which have a different reciprocity low failure, the scale bearer 18 can be exchanged on the dial 13 or 113 against another scale bearer with an exposure time scale developed correspondingly. It is also possible to leave the scale for the exposure time without any numbers or just leave it blank, and to leave it that way in order that the user could himself insert the numbers. Thus, it will be possible for the expert photographer to prepare an exact exposure time scale for any given photographic material in correspondence with the corrective tables.

The main advantage of the exposure meter described is to be found in the simple possibility for exchange of the exposure time scale, in order to take the reciprocity low failure into account. A further advantage will result from the fact that the dial 13 or 113, which covers all the scales, will guard against an unintentional change of the sensitivity adjustment.

In a variation of the design, the scale bearer 18 has instead of or in addition to the exposure time scale 22 or 122 at least one marking 30, FIG. 1 which is opposite to the exposure scale 29 and which is assigned each to one certain flashlight source, which has a pilot light that serves only for measuring the light. If need be, the marking can be arranged adjustably on the bearer 18, so that it can be adapted individually to various flashlight sources of differing intensity. Instead thereof, it will also be possible to finish the scale bearer 18 in such a manner that the user of the light meter can place in the marking 30. When using the variant of the design as described, the object that is to be photographed is illuminated with the help of the pilot light of one or several flashlight devices and then the brightness of the object that is to be photographed will be measured with the light meter, just as it will be seen by the photographic camera. Then the light value as found is set up on the scale 23 opposite the pointer 26, by the proper turning of the dial 13 or 113. The marking 30 on the scale bearer 18, which corresponds to the flashlight source used, will then be located opposite a certain shutter value of the scale 29. This diaphragm value is then adjusted on the lens of the camera, in order to take the photographic picture with flashlight illumination.

Instead of one or several markings 30 for certain flashlight devices, there could also be a numbered flashlight scale on the bearer 18, in which case the user of the light meter would have to do his reading of the correct diaphragm aperture value opposite a graduation line of the flashlight scale assigned to one certain flashlight device or pilot light used.

In another variant of the design, not shown, there could be straight line scales instead of the scales running in the shape of a circular arch, in which case the dial 13 or 113 would be replaced by a slide consisting of a transparent material, said slide bearing the exchangeable scale and covering the remaining scales but leaving them at least partially visible.

In all the described instances, the exchangeable exposure times of flashlight scales could be arranged on the front side of the transparent construction element, dial or slide, instead of on its rear side as shown in the design by way of example.

I claim:
1. In combination with an exposure meter for photographic purposes, a plurality of scales, at least some of which are arranged on different scale carriers which are movable with respect to one another, a transparent element entirely covering all the scales of the meter, a first scale carrier of said scale carriers being arranged at the back side of said element, said transparent element being mounted movably and removably on the meter for movement together with said first scale carrier with respect to the other scale carriers, a second scale and a third scale carrier, said scale carriers being movable one with respect to the other for setting the exposure meter to various sensitivities of photographic materials to be used, the setting of said second and third scale carriers being possible only when said transparent element is removed, and being completely prevented when said element is in place of operation, said transparent element being a dial having a peripheral collar projecting backwards and surrounding the peripheries of all the scale carriers, and a fixed stub arranged on the meter, said transparent element having a central portion which is rotatably and detachably mounted on said stub, cooperating portions of said transparent element and said stub being made and assembled in the manner of a snap fastener.

2. The combination according to claim 1, wherein said first scale carrier is removably and exchangeably arranged on the back side of the transparent element.

3. The combination according to claim 1, wherein said first scale carrier is constituted by an annular disc which is inserted within a peripheral collar of the transparent element, said peripheral collar having recesses on the inner side thereof, and in which an expanding spring ring is provided inserted at the inner side of the collar, said ring, under the influence of its elasticity, being in engagement with said recesses and adapted to hold in place said first scale carrier.

4. The combination according to claim 1, wherein at least two transparent elements are provided, which are identical in size and design but carry scale carriers having differently graduated and numbered scales, said transparent elements being adapted to be mounted and used selectively.

References Cited
UNITED STATES PATENTS

| | | | |
|---|---|---|---|
| 2,205,312 | 6/1940 | Schwartzmann | 235—64.7 |
| 2,220,590 | 11/1940 | Vogt | 116—124.6 |
| 2,489,664 | 11/1949 | Norwood | 235—64.7 |
| 2,529,337 | 11/1950 | Hickok | 235—64.7 |
| 2,532,892 | 12/1950 | Clark | 235—64.7 |
| 2,667,084 | 1/1954 | MacNamara | 116—124.1 |
| 2,917,969 | 12/1959 | Stimm | 235—64.7 |
| 3,199,776 | 8/1965 | Koch | 235—64.7 |

RICHARD B. WILKINSON, *Primary Examiner.*

S. A. WAL, *Assistant Examiner.*